Patented Jan. 13, 1925.

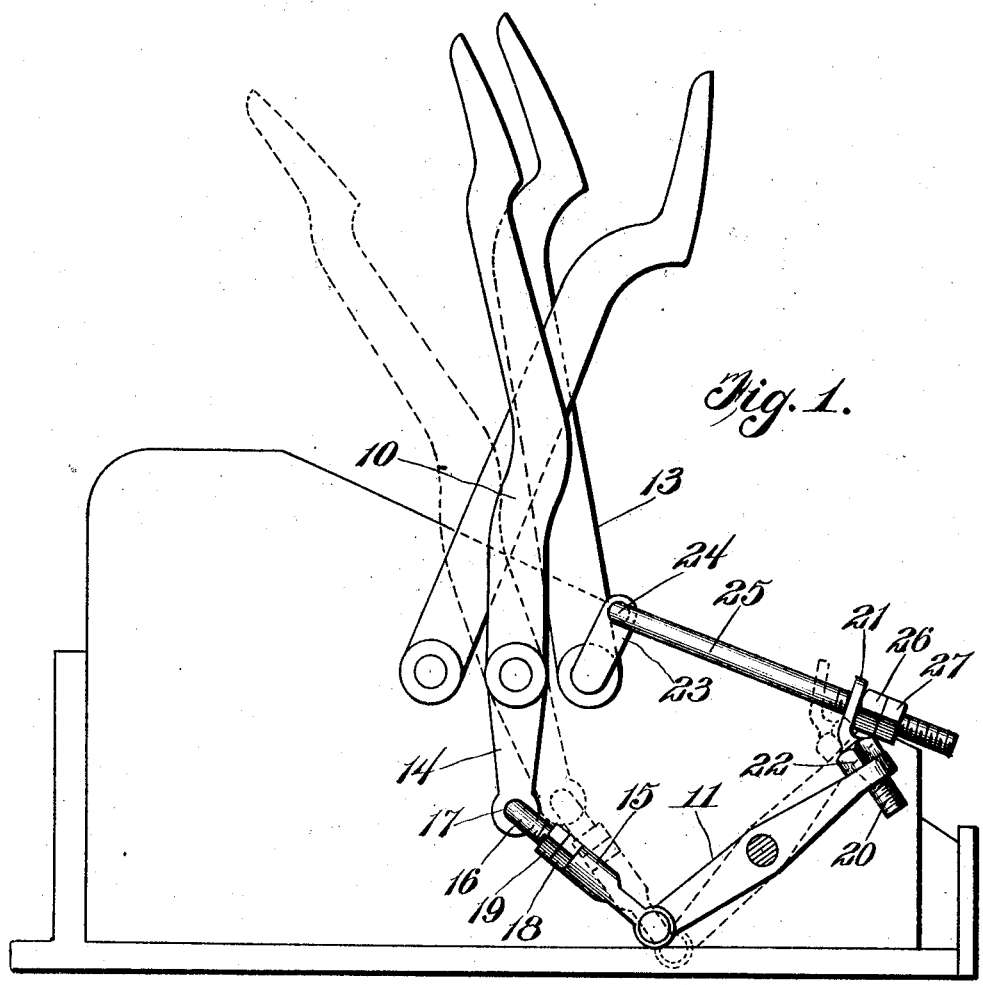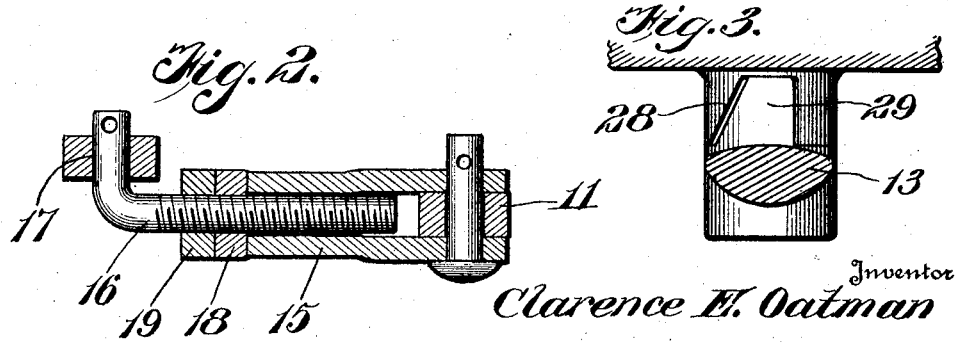

1,522,741

UNITED STATES PATENT OFFICE.

CLARENCE E. OATMAN, OF BATTLEFIELD, MISSOURI.

CLUTCH-RELEASE ATTACHMENT FOR PLANETARY TRANSMISSIONS.

Application filed July 24, 1924. Serial No. 727,967.

*To all whom it may concern:*

Be it known that I, CLARENCE E. OATMAN, a citizen of the United States, residing at Battlefield, in the county of Greene and State of Missouri, have invented certain new and useful Improvements in Clutch-Release Attachments for Planetary Transmissions, of which the following is a specification, reference being had to the accompanying drawings.

This invention relates to clutch release attachments for planetary transmissions and more particularly to a clutch release for the clutches of the transmissions of the type employed in the Ford car operating when the brake is applied.

Devices for this purpose heretofore devised are faulty in that they do not permit movement of the clutch control lever when operated by the brake independently of the low speed lever by means of which the clutch lever is ordinarily operated, with the result that as the brakes wear and a considerable operation of the brake lever is necessary to apply the brakes, the low speed lever is shifted into low speed position engaging the low speed drive mechanism which is directly connected to the drive wheels of the vehicle independently of the clutch, with the result that either considerable strain is put upon the motor or the brakes fail to act and the vehicle continues in motion.

An important object of the invention is to provide a device of this character disconnecting the clutch lever from the low speed lever when the clutch lever is operated by the brake lever.

A further objection to these structures as ordinarily provided is that the brake is applied before the clutch is fully disconnected, with the result that the brake is applied while the clutch is still engaged and a strain placed upon the engine and various parts of the transmission. This is due to the fact that in this type of transmission, as ordinarily constructed, the operation of the brake bands begins immediately upon operation of the lever. An important object of this invention is to provide a lever which is capable of a limited operation prior to the operation of the brake band, so that this strain is eliminated.

These and other objects I attain by the construction shown in the accompanying drawings, wherein for the purpose of illustration is shown a preferred embodiment of my invention and wherein:—

Figure 1 is a side elevation of a transmission having attachments in accordance with my invention, the low speed pedal being shown in solid lines in the position which it occupies when the vehicle is traveling in high gear and the position in dotted lines when the vehicle is traveling in low gear;

Figure 2 is a section through the connection between the clutch lever and the low speed lever;

Figure 3 is an enlarged detail view showing the hub portion of the brake lever and its cam with the coacting cam of the transmission housing.

Referring now more particularly to the drawings, the numeral 10 indicates the low speed lever of a transmission of this character, 11 the clutch lever, and 13 the brake lever. Each of these levers accomplishes the operation of its parts by its rotation about a pivot point, the pivot point of the low speed lever being arranged adjacent to, but spaced from, one end thereof so that the lever has a short arm 14, the clutch lever being pivoted midway between its ends, and the brake lever being pivoted at one end. In the ordinary construction of the device the short section 14 of the low speed lever is connected with one end of the clutch lever 11, so that upon operation of the low speed lever the clutch lever is shifted against the action of the clutch spring (not herein shown) from the position which it normally occupies or which corresponds to the engaged position of the clutch and is illustrated in Figure 1 in solid lines to the position shown in dotted lines wherein the clutch lever is in the position corresponding to the disengaged position of the clutch sections and the low speed gear of the transmission is in operation. The normal extension is inextensible and, in accordance with my invention, I substitute for this connection a connection such as shown in the drawings consisting of two telescopically engaged sections 15 and 16, the section 16 having a hook engaging in an opening 17 formed in the end of the short section 14 of the low speed lever and the section 15 being pivotally engaged with the adjacent end of the clutch lever 11. The section 16 is threaded and slidable within the section 15 and has mounted thereon a stop nut 18 and a lock nut 19 for this stop nut, the stop nut limiting the telescoping of the sections.

Through the opposite end of the lever 11 a threaded opening is formed in which is engaged the threaded shank 20 of an eye 21, the eye being held in adjusted position by means of a lock nut 22. The operating shaft of the brake lever 13 is provided with a crank 23 in which is engaged the hooked end 24 of a link 25 which is slidably directed through the eye and is provided at that side of the eye remote from the hooked end 24 with an adjustable stop nut 26 and a lock nut 27 therefor.

As well known to those familiar with the art, the operation of tightening the bands of this type of transmission is effected by longitudinal shifting of the shafts employed, which is in turn effected by cams coacting upon rotation of the various levers secured to the shafts. In order that the brake levers may have a partial rotation prior to any longitudinal shifting of its shaft, the cams 28 and 29 are so formed that their coacting faces are spaced when the lever is in normal position. No movement of the shaft, other than rotative movement, occurs until the lever has been rotated a predetermined amount. This amount of rotation is sufficient to disengage the sections of the clutch, with the result that before the construction of the brake band of the transmission begins the clutch sections are disengaged and no strain is placed on the sections of the transmission. During movement of the low speed lever to the low speed position, during which the lever is moved from the solid line position of Figure 1 to the dotted line position A and the clutch lever is moved from its solid to dotted line position, the eye 21 slides upon the link 25 and no movement of the brake is effected. When the low speed lever is released it will return to the dotted line position under the influence of the clutch spring, which is at this time forcing the section 15 forwardly against the jam nuts until the clutch sections are fully engaged. At the same time the connections insure maintaining of the brake lever 13 in its rearmost position by reason of the fact that the eye 21 engages the stop nut 26 and draws the link 25 and crank 23 rearwardly. When the brake lever is applied the initial movement thereof serves to disengage the clutch and this disengagement, it will be noted, is effected without effecting any movement whatsoever of the low speed lever. Furthermore, movement of the brake pedal applies the brakes and further disconnects the clutch, still without effecting the low speed lever. From the foregoing it will be obvious that by the use of a construction of this character those disadvantages hereinbefore pointed out are eliminated and at the same time a structure is provided which is readily applied to the vehicle with slight changes in the normal structure thereof.

It will furthermore be obvious that this structure is capable of a certain range of change and modification without materially departing from the spirit of my invention and I accordingly do not limit myself to such specific structure as hereinbefore set forth except as hereinafter claimed.

I claim:—

1. In combination with a transmission including a low speed lever, a brake lever and a clutch lever, the low speed lever being movable in one direction to place the transmission in low gear, the clutch lever being movable in one direction to engage the clutch and in the opposite direction to disengage the same, a connection between the brake lever and the clutch lever moving the clutch lever in the direction to disengage the sections of the clutch when the brake lever is applied and permitting movement of the clutch lever to the position where the clutch is disengaged without movement of the brake lever, and a connection between the low speed lever and clutch lever shifting the clutch lever to disconnecting position when the low speed lever is moved to its operative position and permitting movement of the clutch lever to the disconnecting position without affecting the position of the low speed lever.

2. In combination with a transmission including a low speed lever, a brake lever and a clutch lever, the low speed lever being movable in one direction to place the transmission in low gear, the clutch lever being movable in one direction to engage the clutch and in the opposite direction to disengage the same, a connection between the brake lever and the clutch lever moving the clutch lever in the direction to disengage the sections of the clutch when the brake lever is applied and permitting movement of the clutch lever to the position where the clutch is disengaged without movement of the brake lever, a connection between the low speed lever and clutch lever shifting the clutch lever to disconnecting position when the low speed lever is moved to its operative position and permitting movement of the clutch lever to the disconnecting position without affecting the position of the low speed lever, the brake lever being movable in one direction to apply the brakes, and a mounting for the brake lever permitting movement thereof sufficient to permit the movement of the clutch lever in a direction disconnecting the sections of the clutch sufficient to disconnect the sections of the clutch prior to operation of the brake.

3. In combination with a transmission including a brake lever and a clutch lever, the brake lever being movable in one direction to apply the brakes, the clutch lever being movable in one direction to engage the clutch and in the opposite direction to disengage the same, a mounting for the brake lever permitting a predetermined movement thereof before the brakes are operated, and a connection between the brake and clutch levers moving the clutch lever in a direction disconnecting the clutch during such predetermined movement of the brake lever and permitting movement of the clutch lever to the position where the clutch is disengaged without movement of the brake lever.

4. In combination with a transmission including a brake lever, a brake shaft operated by the lever and shiftable longitudinally upon rotation of the brake lever to apply the brakes, a clutch lever movable in one direction to connect and in the opposite direction to disconnect the clutch, means for shifting the brake shaft longitudinally upon rotation of the brake lever permitting a partial rotation of the brake lever before the shaft is longitudinally shifted when the lever is moved in the direction to apply the brakes, and a connection between the clutch lever and brake lever shifting the clutch lever in a direction to disengage the clutch during such primary movement of the brake lever.

5. In combination with a transmission including a brake lever, a brake shaft operated by the lever and shiftable longitudinally upon rotation of the brake lever to apply the brakes, a clutch lever movable in one direction to connect and in the opposite direction to disconnect the clutch, means for shifting the brake shaft longitudinally upon rotation of the brake lever permitting a partial rotation of the brake lever before the shaft is longitudinally shifted when the lever is moved in the direction to apply the brakes, and a connection between the clutch lever and brake lever shifting the clutch lever in a direction to disengage the clutch during such primary movement of the brake lever, said connection being inoperative to shift the brake lever when the clutch lever is independently operated to disengage the clutch.

In testimony whereof I hereunto affix my signature.

CLARENCE E. OATMAN.